June 26, 1928.  1,675,156
L. J. BROCHE
MACHINE FOR MAKING AND FINISHING GLASS BARS, RODS,
TUBES, BOTTLE NECKS, AND THE LIKE
Filed June 29, 1926  2 Sheets-Sheet 1
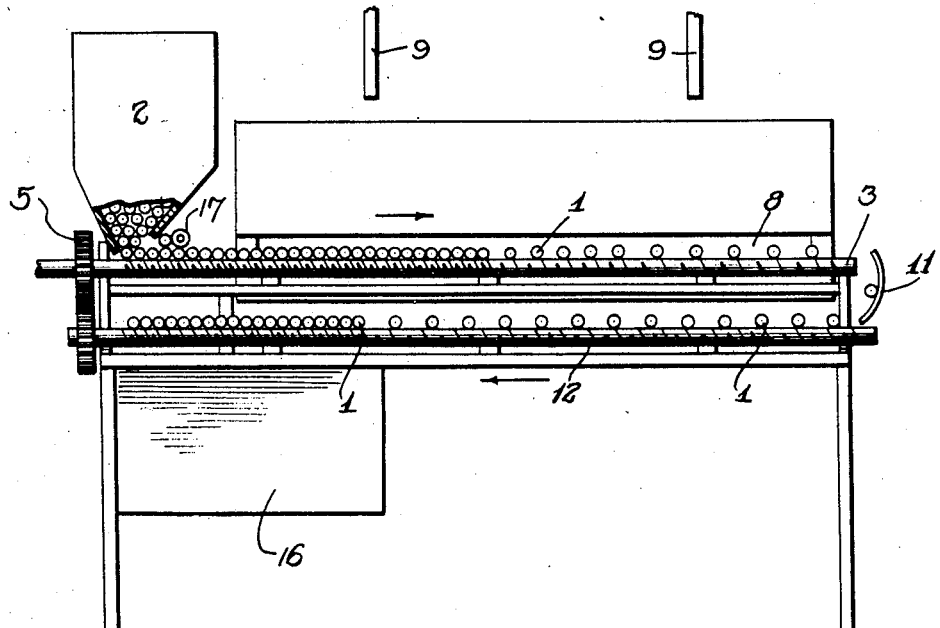
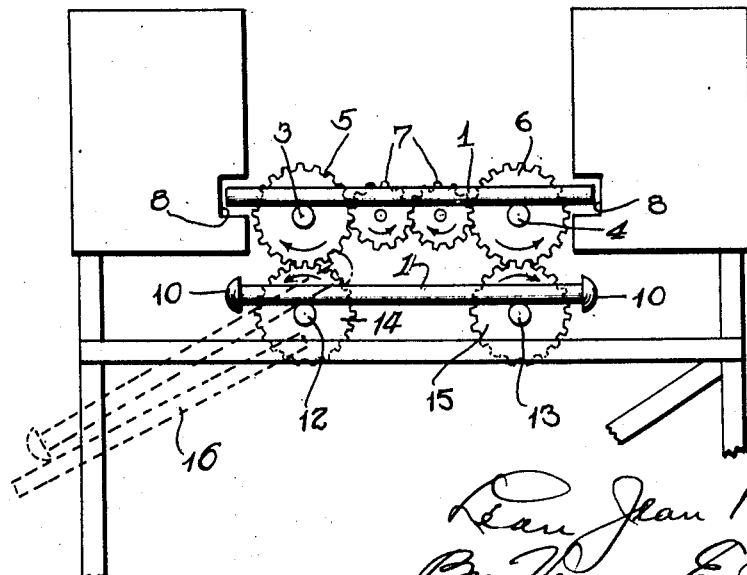

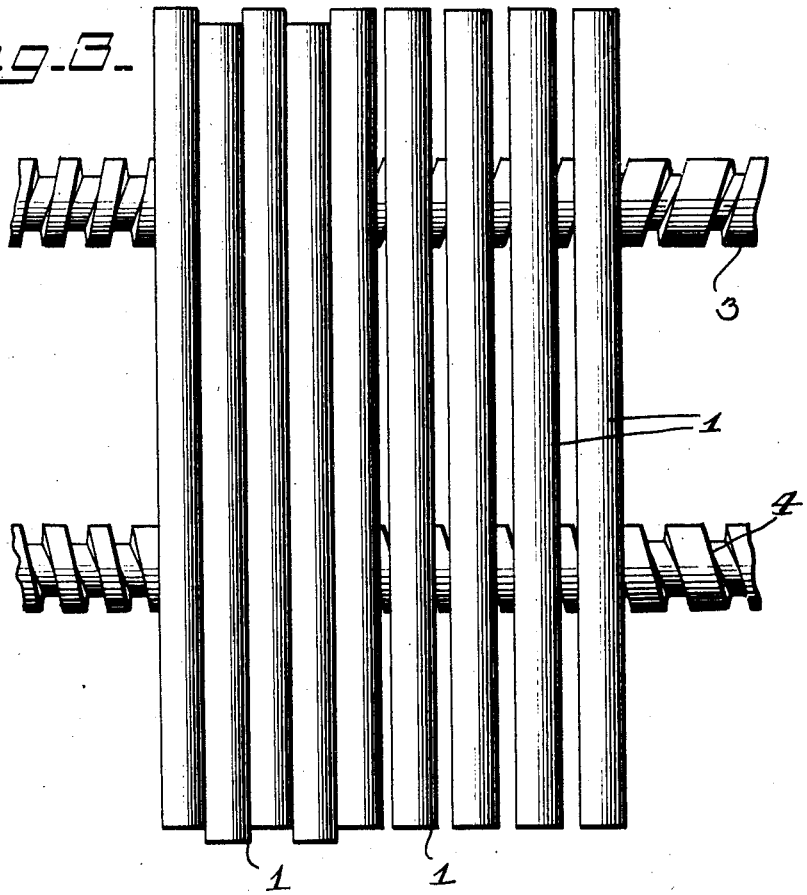
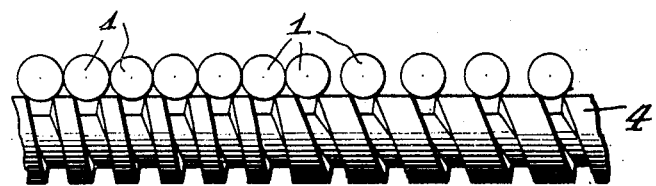

Patented June 26, 1928.

1,675,156

UNITED STATES PATENT OFFICE.

LÉON JEAN BROCHE, OF VINELAND, NEW JERSEY, ASSIGNOR TO KIMBLE GLASS COMPANY, OF VINELAND, NEW JERSEY, A CORPORATION OF ILLINOIS.

MACHINE FOR MAKING AND FINISHING GLASS BARS, RODS, TUBES, BOTTLE NECKS, AND THE LIKE.

Application filed June 29, 1926. Serial No. 119,456.

My invention relates to an improvement in machines for making and finishing glass bars, rods, tubes, bottle-necks, and the like, of which the following is a specification.

This invention consists in mechanical means for feeding the articles successively through the machine, where their ends are heated and rendered semi-plastic preparatory to being fashioned into the shape desired, after which they are conveyed in similar fashion to some convenient point for handling.

In the accompanying drawings:

Fig. 1 is a diagrammatic view in side elevation of the machine;

Fig. 2 is an end view;

Fig. 3 is an enlarged fragmentary plan view; and

Fig. 4 is an end view.

The glass articles, or, as illustrated, the rods 1, are placed in a hopper 2, and fed down by gravity upon the two screws 3 and 4, which are provided with gears 5 and 6 respectively to turn in unison and in opposite directions by reason of the two-intermediate gears 7 as viewed in Fig. 2. It will be observed that the hopper 2 has at its lower end an opening through which rods, tubes or bars lying parallel or in side contact, may pass by gravity directly to the underlying slow pitch sections of the screws 3 and 4 and bridge said screws. It will be further noted that the lower edge of the inclined wall of the hopper on the discharge side terminates at a height sufficient to permit but one article to pass at a time beneath it. The articles hence automatically arrange themselves in a single layer upon the screws and are carried from the hopper in such single layer. Further to ensure this result, a freely rotatable roller or rollers 17 or any usual gage may be employed, such for instance as the common adjustable gate used in coal jigs and like machines.

As seen in Figs. 1, 3 and 4, each screw is of different pitch in different portions of its length. The upper screws have the slow pitch sections at their receiving ends so that the articles are received thereon in close order but are spaced apart as they successively reach the quick pitch sections. The lower screws receive the articles from the upper screws on their quick pitch sections and deliver them to the slow pitch sections, thereby bringing said articles close together on the slow pitch sections, preparatory to discharge from the screws.

While being conveyed forward, the ends of the bars or other articles 1 pass through the glory-holes 8 as viewed in Figs. 1 and 2, where they are softened by the heat of the furnace. These glory-holes are heated to the required degree in any approved manner, as for instance by the burners 9, of which there may be any number.

Upon their reaching the right-hand end of the initial passage through the machine, an operator molds the ends of the rods, forming the heads 10 thereon, if they are to be used as towel-bars or the like. It is obvious, however, that they may be fashioned into any shape at this point. They are then carried to a lower level by a guide 11 and delivered to screws 12 and 13 similar to the screws 3 and 4, the screws 12 and 13 being provided with gears 14 and 15 which are driven respectively by the gears 5 and 6 on the screws 3 and 4 respectively. Thus the lower conveyer-screws 12 and 13 are turned in a direction the reverse of the screws 3 and 4, so that the articles 1 thereon are conveyed back in the opposite direction, through the machine beneath the glory-holes, to the end from which they started, after which they are slid off onto a chute or incline 16 indicated by dotted lines in Fig. 2.

It is evident that the rods, bars or other articles being treated may have a slight tendency to move endwise as they advance in parallel relation to one another, as indicated in Fig. 3. Their main travel, however, is continuous and forward in a direction at a right angle to their length, the portions of the screws which are of quicker pitch serving to separate the articles thereon from those lying on the portions of slower pitch, and from one another, so that the articles are prevented from making contact one with another during and after heating, or while in a softened condition. This separation is maintained on the lower level on the screws 12 and 13, as illustrated in Fig. 1, to give the articles time to cool while running through the furnace. As the articles approach the left-hand or delivery end of the lower screws 12 and 13, by which time they are sufficiently cool to make contact between them safe, they enter upon the slower pitch sections of screws 12 and 13, and are thereby brought into close relation or into contact prior to their discharge from said screws. Such discharge is thus made at the infeeding or left-hand end of the machine as viewed in Fig. 1.

It is obvious that since each screw 12 and 13 is, by reason of the gearing shown and described, caused to rotate in a direction the reverse of screws 3 and 4 immediately above them, the direction of the thread of screws 3 and 12 should be alike and the direction of the threads of screws 4 and 13 should be alike; but if the screws 3 and 12 be threaded to the left or anti-clockwise, the screws 4 and 13 should be threaded to the right or clockwise. The same result would be accomplished if the lower screw of each pair were reversely threaded as related to the upper screw of such pair, and the two screws of a pair were rotated in the same direction about their axes, those of each pair in a direction opposite to those of the companion pair. In other words, to cause the lower screw of either pair to traverse the articles 1 in a direction opposite to the traverse caused by the upper screw of such pair, either the direction of the thread or the direction of rotation of the lower screw must be reversed as related to the direction of thread or as related to the direction of rotation of the upper screw, but not reversed both as to direction of thread and direction of rotation.

Location of the lower screws directly beneath the upper screws and traverse of the articles in opposite directions by and over the upper and lower screws, is advantageous in that the apparatus is rendered much more compact and convenient, and the floor space required is reduced; hence such arrangement is preferred.

It is of course understood that the width and depth of the spiral groove or channel between successive turns or convolutions of the screw thread, must be sufficient to permit bars, rods, or the like, lying upon and at right angles to the screw, to seat themselves at least slightly in such groove or channel. This is true whether a single screw or a plurality of screws be used in any given conveyer.

While I have shown and prefer to employ, screws having the sections of different pitch made integral, it is obvious that they may be made in separate sections suitably connected at their meeting ends as by a polygonal mortise and tenon, thus permitting the threads to be cut or formed at separate operations, or in separate screw-cutting machines, and avoiding the necessity of resetting the cutting tools or changing the relation between such tools and the body in which the thread is being cut.

It is manifest that the number of screws employed may be varied as desired, a single screw being capable of performing the several functions of advancing, separating, bringing together, and delivering the articles treated. It is, however, deemed expedient to employ ordinarily at least two reversely threaded screws in each conveying section of the apparatus, said screws rotating in relatively opposite directions, since each screw under such arrangement tends normally to counteract the tendency of the other screw to cause longitudinal movement of the conveyed articles.

It will be seen from the foregoing description that this invention renders possible and practicable a very simple, compact, efficient, and relatively inexpensive machine, capable of shaping and finishing articles of glass during a single pass through the machine.

Since the machine has for its purpose the shaping and finishing of glass articles, it is manifest that there must be present means for heating such articles to permit of their being shaped, and means for advancing the articles past in proper relation to such heating means, for separating the articles before they become softened by the heat, and for maintaining them in separated relation while being heated and shaped and until they have cooled and hardened sufficiently to prevent injury, or adhesion of one article to another, as would occur in case contact were permitted while the articles were still soft.

I claim:

1. A machine for making and finishing glass articles, comprising conveying means consisting of two rotatable screws threaded respectively right and left, each screw having a section of relatively slow pitch and a section of relatively quick pitch, the quick pitch sections serving to advance at a more rapid rate than the slow pitch sections articles laid upon and bridging the screws, and thus to separate the articles from one another and maintain them separated during their travel over the quick pitch sections; and means for heating said articles while passing over said screws, to permit shaping of the articles.

2. A machine for making and finishing glass articles, comprising a conveyer screw having throughout one portion of its length a thread of relatively slow pitch and throughout another portion of its length a continuation of said thread, of relatively quicker pitch, whereby said screw is adapted to advance at a relatively slow initial speed and at a quicker subsequent speed, and at a relatively quicker initial speed and a slower final speed, articles crossing the screw and resting thereon, according to the direction in which the screw is turned and to the section thereof on which the article is initially placed; and means for heating said articles while passing over said conveyer, to permit shaping of the articles.

3. A machine for making and finishing glass articles, comprising a conveying mechanism consisting of two rotatable screws each having a relatively slow pitch at its receiving end and for a portion of its length and a relatively quick pitch thence to its delivery end, whereby the screws are adapted to carry forward articles bridging the two screws and to separate and space apart said articles at the points where the pitch changes, by reason of the more rapid feeding action of the quick pitch sections; and means for heating said articles while passing over the screws, to permit shaping of the articles.

4. A machine for making and finishing glass articles, comprising a conveyer consisting of two screws, each having two portions of relatively different pitch, one threaded in its receiving portion at a relatively slow pitch and in its delivery portion at a relatively quick pitch, the other screw having in its receiving portion a relatively quick pitch and in its delivery portion a relatively slow pitch; means for rotating said screws in proper direction to cause articles delivered thereon to traverse the first screw from the receiving end of slow pitch to the delivery end of quick pitch and the second screw from the end of quick pitch to the end of slow pitch, whereby the articles are started on their travel in close relation and are at the point of pitch change separated and moved forward at a more rapid rate, and are by the second screw received upon the portion of quicker pitch, held apart, and moved a distance at the more rapid rate, brought together upon the section of slower pitch, and finally delivered therefrom in close relation; and means for heating said articles while passing over the screws, to permit shaping of the articles.

5. A machine for making and finishing glass articles, comprising a conveyer consisting of an upper and a lower pair of screws each screw having portions of relatively slow and relatively quick pitch, the first pair of screws having the slow pitch at the receiving and the quick pitch at the delivery end, and the second pair having the quick pitch at the receiving and the slow pitch at the delivery end; means for heating the articles during their passage over the upper screws; means for transferring the heated articles from the first to the second pair of screws; and means for rotating the screws of the first pair to effect travel of the articles from the section of slower pitch to the section of quicker pitch, and for rotating the second pair of screws to effect travel of said articles from the portions of quicker pitch to the portions of slower pitch.

6. A machine for making and finishing glass articles, comprising a conveyer screw having a thread formed with successive sections of relatively different pitch; and means for heating the articles during their passage over the conveyer screw, to permit shaping of said articles.

7. A machine for making and finishing glass articles, comprising a pair of screws of like dimensions each having a thread formed with successive sections of relatively different pitch; means for rotating said screws at uniform speed; and means for heating the articles during their passage over the screws, to permit shaping of said articles.

8. A machine for making and finishing glass articles, comprising a conveyer consisting of a pair of screws of like dimensions but reversely threaded, said screws having each a continuous thread with successive sections of similarly varying pitch; means for rotating said screws in relatively opposite directions and at like speed; and means for heating the articles during their passage over said screws, to permit shaping of said articles.

9. In a machine of the character described, a conveyer for rods, bars, and the like, comprising two screws each having two portions of relatively different pitch, one threaded in its receiving portion at a relatively slow pitch and in its delivery portion at a relatively quick pitch, the other screw having in its receiving portion a relatively quick pitch and in its delivery portion a relatively slow pitch; and means for rotating said screws in proper direction to cause articles delivered thereon to traverse the first screw from the receiving end of slow pitch to the delivery end of quick pitch and the second screw from the end of quick pitch to the end of slow pitch; whereby articles are started on their travel in close relation and are at the point of pitch change separated and moved forward at a more rapid rate, and are by the second screw received upon the portion of quicker pitch, held apart, and moved a distance at the more rapid rate, and finally brought together upon the section of slower pitch and delivered therefrom in close relation.

10. In a machine of the character described, a conveyer comprising upper and lower pairs of screws each screw having portions of relatively slow and relatively quick pitch, the first pair of screws having the slow pitch at the receiving and the quick pitch at the delivery end, and the second pair having the quick pitch at the receiving and the slow pitch at the delivery end; means for transferring articles from the first to the second pair of screws; and means for rotating the screws of the first pair to effect a travel of the articles from the section of slow pitch to the section of quick pitch, and for rotating the second pair of screws in a direction to effect movement of said articles from the portions of quicker pitch to the portions of slower pitch.

11. In a machine of the character described, a conveyer comprising one or more conveyer screws; and a hopper above said screws having an unobstructed opening at its lower end through which articles contained therein may pass from the hopper to and lie in the upper portion only of the groove or grooves of the conveyer screw or screws and be supported thereby in a single layer of separate articles, and be advanced in such single layer by the conveyer while articles above such layer are held back.

In testimony whereof I affix my signature.

L. J. BROCHE.